United States Patent [19]

Brooks

[11] Patent Number: 4,802,784
[45] Date of Patent: Feb. 7, 1989

[54] BI-FLEX PIVOT

[75] Inventor: John J. Brooks, Santa Ynez, Calif.

[73] Assignee: Santa Barbara Research Center, Goleta, Calif.

[21] Appl. No.: 167,202

[22] Filed: Mar. 11, 1988

[51] Int. Cl.4 ............................................... F16D 1/00
[52] U.S. Cl. ........................................ 403/24; 403/291; 74/5 F; 267/160
[58] Field of Search ............. 403/291, 24; 74/5 F; 464/100; 267/160

[56] References Cited

U.S. PATENT DOCUMENTS 3,181,918  5/1965  Troeger ........................ 267/160 X
3,703,584  1/1963  Troeger ........................ 464/100 X Primary Examiner—Andrew V. Kundrat
Attorney, Agent, or Firm—W. C. Schubert; V. G. Laslo; A. W. Karambelas

[57] ABSTRACT

A structural pivot 10 includes a first sleeve 18 and a second sleeve 20 which are connected together by a pair of flexures 22 and 24. Each flexure includes a pair of blades 40, 42 and 54, 56. The free ends of the blades are connected to the sleeves 18, 20 while the common cross members 44 and 62 remain spaced from the inner surfaces of the sleeves. During angular rotation of the sleeves, the blades can flex without resulting in a geometric center shift for the pivot.

14 Claims, 2 Drawing Sheets

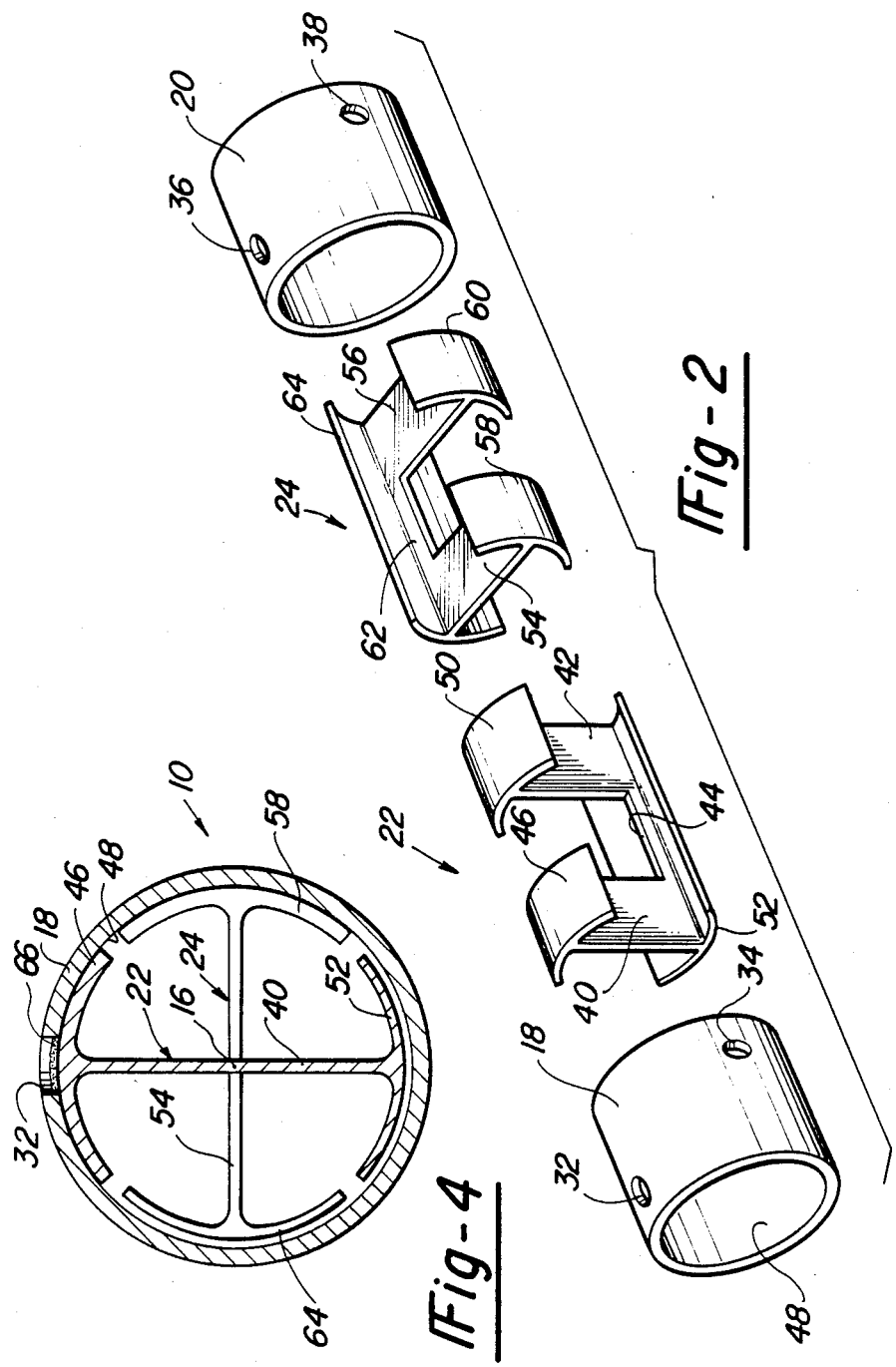

BI-FLEX PIVOT

BACKGROUND

1. Technical Field

This invention relates to joints for rotating members and, more particularly, to structural pivots.

2. Discussion

Structural pivots are often used to overcome many of the disadvantages associated with other types of rotating joints such as knife edges, bearings, ball and socket joints and the like. Among the advantages of structural pivots is the elimination of friction, backlash, wear, the lack of requirement for lubrication, insensitivity to contamination, and the ability to operate over a wide range of environmental conditions. Structural pivots can be used in a wide variety of applications such as in gimbal ring mounts, pressure transducers, throttle linkages and automatic bag fillers. They are also finding increasing application in optical systems for mounting rotating mirrors and the like.

One of the best known commercially available structural pivots is the "Free-Flex" pivot marketed by the Electric and Fluid Power Division of The Bendix Corporation. The construction of the Free-Flex pivot is described in the trade literature and in a paper by Troeger, "Considerations in the Application of Flexural Pivots", Automatic Control Data Systems Engineering, Volume 17, No. 4, November, 1962. Despite its several advantages, the Free-Flex design also has its share of disadvantages. One particular drawback is that the geometric center of its rotating member will shift as the member is angularly deflected. As a result, its use in several applications like the above-mentioned precision optical systems is limited unless special precautions are taken. In addition, it would be desirable to improve the lifetime and reliability characteristics of this known design.

SUMMARY OF THE INVENTION

Pursuant to the present invention, a structural pivot is provided that substantially eliminates the geometric center shift of its rotating members. Both of the rotating members are in the form of cylindrical sleeves sharing a common axis. A pair of flexure members are provided each having at least two spaced apart blades joined by a common cross member. The free end of the first blade of the first flexure is connected to the inner surface of the first sleeve, while the free end of the second blade of the same flexure is connected to the second sleeve. The blades of the first flexure are connected so that they define a first plane passing through the axes of the sleeves. The second flexure member likewise contains third and fourth blades joined by a common cross member. The free end of the third blade is connected to the inner surface of the first sleeve, while the free end of the fourth blade is connected to the inner surface of the second sleeve. The blades of the second flexure member are connected so that they define a second plane which also passes through the axes of the sleeves but is substantially transverse to the first plane defined by the blades of the first flexure member.

BRIEF DESCRIPTION OF THE DRAWINGS

The various advantages of the present invention will become apparent to those skilled in the art upon reading the followings specification and by reference to the drawings in which:

FIG. 2 is an exploded perspective view of the pivot made in accordance with the teachings of the present invention;

FIG. 4 is a cross sectional view taken along the lines 4—4 of FIG. 3.

DESCRIPTION OF THE PREFERRED EMBODIMENT

Figure 1:
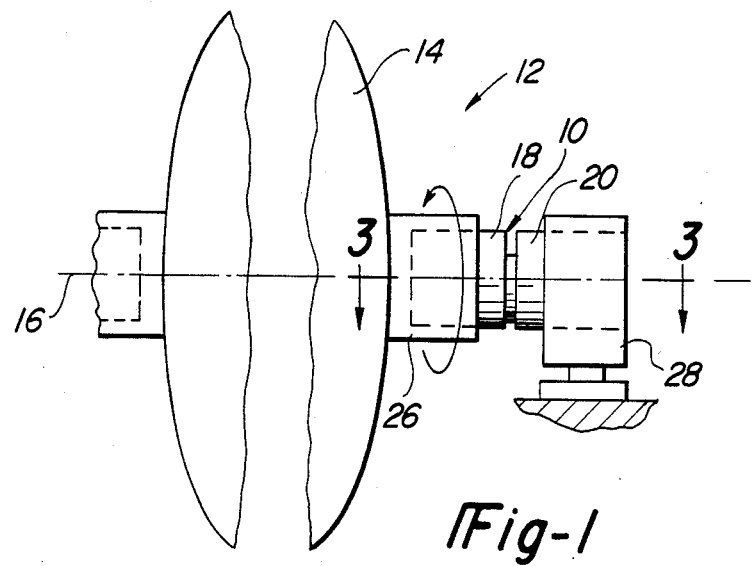
FIG. 1 is an environmental view showing a structural pivot made in accordance with the teachings of this invention, the pivot being mounted to an oscillating mirror in an optical system.

With reference now to the drawings, the structural pivot 10 of the preferred embodiment of this invention is shown in FIG. 1 as being used in conjunction with an optical system 12 employing a rotating mirror 14. In practice, two pivots 10 (as illustrated) are often employed on opposite sides of the mirror along a pivot axis 16.

As shown most clearly in FIG. 2, the pivot 10 includes four main parts: two substantially identical end sleeves 18 and 20; and two substantially identical flexure members 22 and 24. Although the pivot 10 can be mounted in a variety of manners, it is shown being mounted to mirror 14 in FIG. 1 by having sleeve 18 fixed to a mirror receptacle 26 while the other sleeve 20 is connected to a rigid mount 28.

As noted before, each sleeve is substantially identical. In a particular useful (but not limiting) embodiment, the sleeves have an outer diameter of 0.75 inch and an inner diameter of 0.682 inch. They are about 0.575 inch in length and they each include a pair of openings extending therethrough. For example, sleeve 18 includes an opening 32 extending therethrough and a second opening 34 which is located at about a 90 degree angle and longitudinally spaced from opening 32. Openings 36 and 38 are similarly formed in sleeve 20. As will appear, these openings are used to connect the flexure members 22, 24 to the sleeves 18, 20.

The flexure members 22 and 24 are likewise substantially identical although they are connected to the end sleeves substantially transversely to one another. Flexure member 22 includes a pair of spaced apart blades 40, 42 which are joined by a common cross member 44. The free end of blade 40 terminates in an arcuate flange 46 which conforms to the inner surface 48 of sleeve 18. Similarly, the free end of blade 42 includes a flange 50 while the cross member 44 terminates in a longitudinally extending arcuate flange 52. Analogously, flexure 24 includes a pair of blades 54, 56 having flanges 58, 60 on their free ends. Their common ends are joined by cross member 62 which terminates in an arcuate flange 64.

Again, by way of a nonlimiting example, each flexure member is about 0.925 inches in total length, one blade being about 0.275 inches in length and spaced from the other blade by about 0.355 inches, the other blade therefore being about 0.295 inches in length. The outer diameter of each flexure member is about 0.676 inch. Thus, each flexure member is smaller than the inner diameter of the sleeves to thereby permit the common end of each flexure member to remain spaced from the sleeves. The blades of the flexure members are about 0.0217 inch thick. In this particular example, all of the components are made of 17-4 PH stainless steel. It should be understood that these dimensions and materials are merely exemplary.

Figure 3:
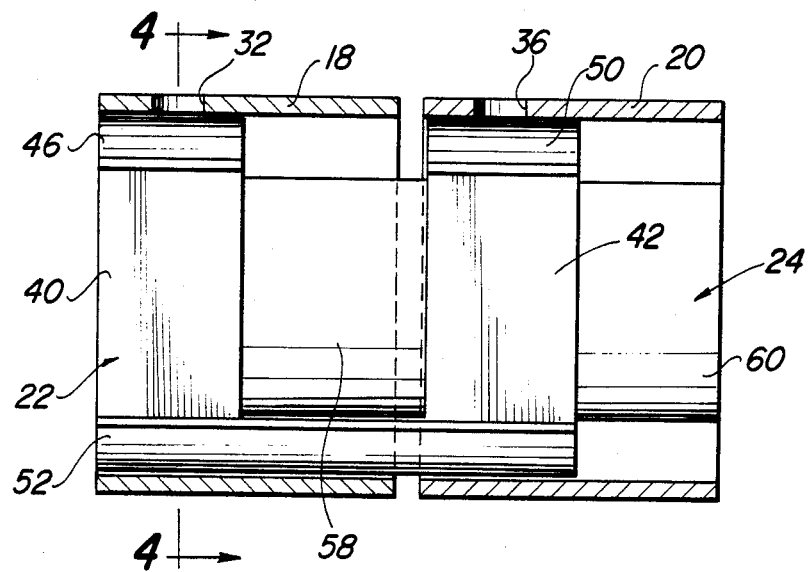
FIG. 3 is a cross sectional view of the pivot taken along the lines 3—3 of FIG. 1.

Turning now to FIGS. 3 and 4, the interconnection between the flexure members and sleeves will be described. The free ends of the blades 40, 42 of flexure member 22 are connected to sleeves 18 and 20, respectively. Flange 46 on the free end of blade 40 is connected to the left-most portion of sleeve 18. This is preferably accomplished by placing epoxy adhesive 66 through opening 32 to bond the flange 46 to the inner surface 48 of sleeve 18. Note that the respective dimensions of the sleeve 18 and flexure member 22 cause the flange 52 of the cross member 44 to remain spaced from the inner surface of the sleeve 18. The flange 50 of blade 42 is similarly connected to the inner surface of sleeve 20. Preferably, this is accomplished by the use of adhesive which has been injected through opening 36. As can be seen in FIG. 4, the blades of flexure 22 define a vertical plane which passes through the major axis 16 of the pivot 10.

Flexure 24 has its blades interdigitated with the blades of flexure 22 except that they are mounted to sleeves 18, 20 in a substantially transverse plane. In particular, flange 58 is bonded to the right-most portion of sleeve 18 via epoxy injected through opening 34. Similarly, flange 60 of blade 56 is connected to the right-most portion of sleeve 20 by way of adhesive injected through opening 38. Again, note that the common cross member 62 and its associated flange 64 remain spaced from the inner surface of the sleeves. Also, note that the blades of flexure 24 define a substantially horizontal plane (i.e., transverse to the plane defined by the blades of flexure 22). However, the plane defined by the blades of flexure 24 also pass through common axis 16.

An important aspect of the present invention is that the pivot 10 exhibits substantially no geometric shift of the axis of rotation when either of the rotating members, i.e., sleeves 18 or 20 are angularly deflected. Accordingly, the pivot 10 finds particular utility in those applications, such as in the optical system described in connection with FIG. 1, where it is desirable to minimize this geometric shift that has been a disadvantage in the known prior art designs. In addition, the present invention is optimized for large torsional compliance and high lateral stiffness and strength. All of these advantages are achieved with a comparatively simple construction. Various other advantages will become apparent to those skilled in the art after having the benefit of studying the specification, drawings and following claims.

What is claimed is:

1. A structural pivot that substantially eliminates the geometric center shift of its rotating members, said pivot comprising:
    a first sleeve having a major axis and an inner surface;
    a second sleeve having a major axis and an inner surface, said second sleeve being spaced from the first sleeve;
    a first flexure having first and second spaced apart blades joined by a common cross member, each blade having a free end, the free end of the first blade being connected to the inner surface of the first sleeve, while the free end of the second blade is connected to the inner surface of the second sleeve, the blades being connected so that they define a first plane passing through the axes of the sleeves; and
    a second flexure member having third and fourth spaced apart blades joined by a second common cross member, the third and fourth blades having free ends, the free end of the third blade being connected to the inner surface of the first sleeve, while the free end of the fourth blade is connected to the inner surface of the second sleeve, the third and fourth blades being connected so that they define a second plane passing through the axes of the sleeves, said second plane being substantially transverse to the first plane.

2. The pivot of claim 1 wherein the free ends of each blade include flanges conforming to the inner surfaces of the sleeves.

3. The pivot of claim 2 wherein the first sleeve includes a first opening extending transversely therethrough and a second opening located about 90 degrees and axially spaced from the first opening; and
    wherein adhesive in the first and second openings is used to connect the first and third flanges to the inner surface of the first sleeve.

4. The pivot of claim 3 wherein said second sleeve includes a first opening extending therethrough and a second opening located about 90 degrees and axially spaced from the first opening; and
    wherein adhesive in the first and second openings of the second sleeve is used to connect the second and fourth flanges to the inner surface of the second sleeve.

5. The pivot of claim 2 wherein each cross member terminates in a longitudinally extending flange which remains spaced from the inner surfaces of the first and second sleeves.

6. The pivot of claim 1 wherein said flexure members are substantially identical and each formed from an integral piece of metal.

7. The pivot of claim 5 wherein each sleeve is cylindrical and wherein the flanges on the free ends of the blades and cross members are arcuate.

8. A structural pivot that substantially eliminates the geometric center shift of its rotating members, said pivot comprising:
    a first cylindrical sleeve having a major axis and a circular inner surface, said inner sleeve having a first opening extending transversely to the axis, said sleeve having a second opening location about 90 degrees from and axially spaced from the first opening;
    a second cylindrical sleeve having an axis collinear with the axis of the first sleeve, the sleeve having a circular inner surface, the sleeve having a first opening extending transversely to the axis and a second opening which is 90 degrees from and axially spaced from the first opening;
    a first flexure made of an integral piece of metal, the first flexure having first and second spaced apart blades joined by a common cross member, each blade having a free end with an arcuate flange thereon conforming to the inner surfaces of the sleeves, the flange of the first blade being located under the first opening in the first sleeve and connected thereto by adhesive injected through the opening, the flange of the second blade being located under the first opening of the second sleeve and connected thereto by adhesive injected through the first opening therein, the first and second blades being connected so that they define a first plane passing through the major axis of the sleeves;

a second flexure member having third and fourth spaced apart blades joined by a common cross member, each blade having a free end with an arcuate flange thereon conforming to inner surfaces of the sleeves, the flange of the third blade being located under the second opening in the first sleeve and connected thereto by adhesive, the flange of the fourth blade being located under the second opening in the second sleeve and connected thereto by adhesive, the third and fourth blades defining a second plane passing through the axes of the sleeves and being substantially transverse to the first plane; and the cross members being spaced from inner surfaces of the sleeves whereby said blades flex when the sleeves are rotated without creating a geometric center shift between the axes of the sleeves.

9. An optical system comprising:

a rotating mirror;

a structural pivot including first and second concentric and axially spaced sleeves having a common axis; a first flexure having first and second spaced apart blades joined by common cross member, a free end of the first blade being connected to the first sleeve, while the free end of the second blade is connected to the second sleeve, the blades being connected so that they define a first plane passing through said axis; a second flexure which is substantially identical to the first flexure, the free ends of the blades of the second flexure being connected to the first and second sleeves adjacent to the blades of the first flexure while defining a second plane substantially transverse to the first plane;

means for connecting one of the sleeves to the mirror;

means for connecting the other sleeve to a fixed support; and whereby the first sleeve rotates with the mirror without creating a geometric center shift between the sleeves.

10. The optical system of claim 9 wherein each sleeve includes a circular inner surface, and wherein each flexure member includes arcuate flanges on the free ends of the blades and cross member.

11. The optical system of claim 10 wherein the arcuate flange of the cross member of each flexure remains spaced from the inner surfaces of the sleeves.

12. The optical system of claim 11 wherein the blades are adhesively connected to the sleeves.

13. The optical system of claim 12 wherein the sleeves include openings therein through which adhesive can be injected.

14. The optical system of claim 13 wherein each flexure member is constructed of an integral piece of metal.

* * * * *